United States Patent Office 3,557,121
Patented Jan. 19, 1971

3,557,121
2,6 - DIOXO - 4 - BENZIMIDAZOLYLMETH-
YL-, -BENZOTHIAZOLYLMETHYL-, AND
-BENZOXAZOLYLMETHYLPIPERIDINES
Herman E. Faith, Indianapolis, Ind., assignor to The Dow
Chemical Company, Midland, Mich., a corporation of
Delaware
No Drawing. Filed May 13, 1968, Ser. No. 728,744
Int. Cl. C07d 29/20, 91/44
U.S. Cl. 260—281                                    7 Claims

ABSTRACT OF THE DISCLOSURE

Disclosed are new series of 2,6-dioxo-4-benzimidazolyl-methylpiperidine, 2,6-dioxo-4-benzothiazolylmethylpiperidine and 2,6-dioxo-4-benzoxazlymethylpiperidine compounds and derivatives thereof wherein the piperidine ring nitrogen is substituted with an alkyl, allyl or alkylaminoalkyl group and certain mineral acid salts thereof. These compounds are useful as parasiticides.

---

The present invention is concerned with and directed to novel and useful heterocyclic derivatives of 2,6-dioxopiperidine-4-acetic acid (otherwise known as glutarimide-α-acetic acid) and, more particularly, to 2,6-dioxo-4-benzimidazol-2-ylmethyl)piperidines, 2,6-dioxo-4-(benzothiazol-2-ylmethyl)piperidines, and 2,6-dioxo-4-(benzoxazol-2-ylmethyl)piperidines and derivatives thereof wherein the piperidine ring nitrogen is substituted with an alkyl, allyl or alkylaminoalkyl group and the mineral acid salts of those compounds containing such alkylaminoalkyl group. The non-salt compounds can be represented by the following Formula I:

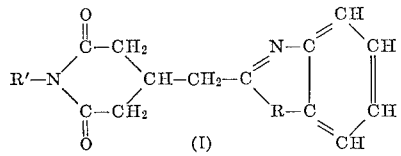

In this and succeeding formulas, R' represents hydrogen, (lower)alkyl, allyl, or (lower)alkylamino(lower)alkyl and R repersents an oxygen atom, a sulfur atom or an imino group.

The term "(lower)alkyl" wherever employed in the present specification and claims defines a radical containing 1 and 2 and 3 carbon atoms and from 1, to 2, to 3 carbon atoms including the various structural isomers thereof, to-wit: methyl, ethyl, n-propyl and isopropyl. "Allyl" denotes the (CH$_2$=CHC$_2$—) radical. Representative "(lower)alkylamino(lower)alkyl" groups include methylaminomethyl, dimethylaminomethyl, ethylaminoethyl, diethylaminopropyl, n-propylaminomethyl, di-n-propylaminopropyl, isopropylaminoethyl, diisopropylaminomethyl, methylethylaminopropyl, methylisopropylaminomethyl, ethyl-n-propylaminomethyl, and so forth.

The mineral acid salts are of the compounds of Formula I wherein R' represents a (lower)alkylamino(lower)alkyl substituent and a mineral acid such as hydrochloric, hydrobromic, hypochlorous, bromic, phosphoric, nitric and sulfuric acids.

The novel products of the present invention are crystalline solids, somewhat soluble in certain organic solvents but of relatively low solubility in water. The mineral acid salts possess enhanced solubility in water. These compounds are useful as parasiticides for the control of a wide variety of parasite pests such as worms, ascarids and so forth. Representative 1-substituted-2,6-dioxo-4-benzimidazol - 2-ylmethylpiperidines, 1-substituted - 2,6-dioxo-4-benzothiazol-2-ylmethylpiperidines, 1-substituted-2,6 - dioxo-4-benzoxazol-2-ylmethylpiperidines or derivatives thereof include those wherein the substituents (R') are allyl, ethyl, and isopropyl. Other representative compounds are those where substituents (R') are 1-ethylaminopropyl, diethylaminomethyl, and methylaminomethyl and the hydrobromide, hydrochloride, sulfate, phosphate and nitrate salts of such compounds.

The compounds of the present invention in which, with respect to Formula I and its attendant definitions, R' is hydrogen are prepared by reacting together 2,6-dioxopiperidine-4-acetic acid which is represented by Formula II:

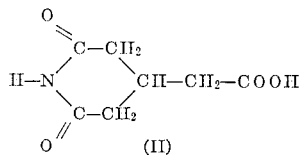

and an o-disubstituted benzene of Formula III:

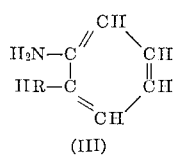

The reactants can be employed in any relative amount; however, the reaction consumes the reactants in the proportion of one mole of the 2,6-dioxopiperidine-4-acetic acid per mole of the o-disubstituted benzene reactant and the employment of such proportions or a slight excess, upwards of a ten percent or more molar excess, of the 2,6-dioxopiperidine-4-acetic acid reactant in comparison to the o-disubstituted benezne reactant can be employed. The reaction is preferably conducted using polyphosphoric acid as the reaction medium. When thus used, polyphosphoric acid is suitably present in amounts sufficient to provide adequate medium for the contacting of the reactants. In this manner, polyphosporic acid serves the dual function as reaction vehicle or medium as well as a catalyst for the described reaction. Alternatively, the reaction can be conducted utilizing, toegther with polyphosphoric acid, an inert organic solvent, such as toluene, chloroform, and benzene, either singly or mixtures thereof, as the reaction medium. In this latter embodiment, the polyphosporic acid serves as catalyst for the reaction and cooperates with the organic solvent as reaction medium for the reaction. The reaction proceeds readily when conducted at temperatures ranging from about 50° C. to about 200° C. or more. The temperature can be controlled by supplying external heat to the reaction, in conventional manners, as required. Upon completion of the reaciton, the desired products are separated by conventional procedures such as filtration, extraction, and the like.

In conducting this reaction, the 2,6-dioxopiperidine-4-acetic acid and o-disubstituted benzene reactants and polyphosphoric acid or inert organic solvent, if employed, are mixed together in any convenient fashion. The reactants are then contacted and maintained together at a temperature of from 50° C. to 200° C., preferably, from 150° to 180° C. for a period of time sufficient to produce the product, usually ranging from a few minutes to several hours, and generally with stirring. Sometimes it is convenient to raise the reaction mixture to the boiling temperature and thereafter maintaining reflux for the reaction period. Upon reaction end, the products are recovered via conventional means such as through precipitation and subsequent conventional recovery techniques. In one convenient method, the reaction mixture is quenched with cold water which induces precipitation of the crystalline product. This is thereafter removed by filtration and further purified by usual recrystallization techniques, if desired.

The benzimidazol-2-ylmethylpiperidines of the present invention can be prepared via an alternative method which involves reacting together substantially mole per mole amounts of 2,6-dioxopiperidine-4-acetyl chloride and o-nitroaniline. This reaction is conducted in the presence of a tertiary amine, such as the tertiary loweralkylamines (trimethylamine and triethylamine, etc.) and pyridine, as a reaction medium and catalyst in appropriate amounts to provide sufficient reactant contact and catalytic effects and at temperatures of from 0° to 50° C. for a period of time sufficient to prepare the corresponding intermediate hydrated 2'-nitro-2,6-dioxopiperidine-4-acetanilide. This intermediate is thereafter treated at from about 50° C. to about 150° C. and, preferably, at the boiling point and under reflux in an acetic acid mixture containing iron dust which is added portionwise to the resultant solution of intermediate and acetic acid. The iron dust serves as a reducing agent in the ensuing reaction. This reaction is conducted with vigorous stirring over a period of several hours. Following the reaction, the reaction mixture is neutralized with base solution and the resulting precipitate recovered such as via filtration.

The compounds of the present invention which contain the defined substituents (R') on the piperidine nitrogen atom are prepared by reacting together the corresponding unsubstituted compound of the Formula IV:

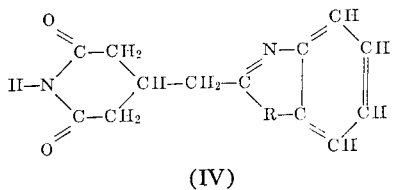

(IV)

which compounds are prepared as described above, and a halide of the Formula V:

R'—X (V)

wherein X is chloro or bromo, in the presence of sodium hydride or potassium carbonate as coreactant. This reaction is conveniently conducted in an inert, liquid reaction medium such as can be provided by toluene, benzene, acetone, methylethylketone and the like. In this reaction, the 2,6-dioxo-4-substituted piperidine reactant and the halide reactant and the employed co-reactant are consumed in substantially equimolecular amounts and the employment of such proportions or a slight excess of the co-reactant in comparison to the other two reactants is prefered. This reaction proceeds smoothly at temperatures of from 20° C. to 150° C. or more and conveniently at the boiling point and under reflux conditions for from a few minutes to a few hours. The conditions and extent of reaction can be adjusted and monitored by the observation of hydrogen gas evolution, the reaction being substantially complete upon its cessation. Upon termination of the reaction, the appropriate product is recovered via conventional means including reaction mixture concentration with subsequent recrystallization.

In practicing the above reaction, the reactants and solvents are mixed together in any convenient fashion. In one manner, the 2,6-dioxo-4-substituted piperidine is dissolved in anhydrous toluene together with the desired co-reactant and to the resulting solution is added the halide reactant in a solution of toluene. The reaction mixture is thereafter preferably raised to the boiling point and maintained under reflux for a period sufficient to produce the product, usually ranging for a few minutes to several hours, as can be monitored by the observation of hydrogen evolution. Thereafter the reaction mixture is cooled and evaporated in vacuum and the resultant concentrate is washed well with water and recrystallized to give the product isolation.

The mineral acid salts of the 1-(lower)alkylamino-(lower)alkyl substituted (R') piperidines are prepared by dissolving the appropriate starting compound in an organic solvent such as methylene chloride, chloroform, 1,1,1-trichloroethane or anhydrous ether and thereafter treating the resultant solution with an excess of the mineral acid, preferably by means of an organic solvent (ether, ethanol, etc.) saturated therewith, to produce the desired salt. This reaction can be conducted at from about 20° C. to the boiling point of the mixture, preferably at ambient temperatures, and usually with stirring. Although the piperidine compound and the employed acid are consumed in substantially equimolecular amounts, an excess, upwards of a fivefold molar excess, of the mineral acid reactant is usually employed without deleterious effects to insure complete salt formation. The salt products are separated from the reaction mixture by filtration or by concentration of the reaction mixture to initiate the precipitation of the product. The thus precipitated salt product is then isolated by filtration, decantation, or centrifugation and can be further purified by recrystallization.

The following examples serve further to illustrate the manner by which the present invention can be practiced but, as such, are not to be construed as limitations upon the overall scope hereof.

EXAMPLE 1

2,6-dioxopiperidine-4-acetic acid (3.76 grams; 0.022 mole) and o-aminobenzenethiol (2.5 grams; 0.02 mole) are mixed, at room temperature and with stirring, together with 10 grams of polyphosphoric acid. This mixture is then heated, while continuing the stirring, to a temperature of 160°–170 C. and is maintained at this temperature for a period of 65 minutes. While still warm, the mixture is poured into water which precipitates a solid. The solid so precipitated is recovered by filtration and recrystallized from ethyl alcohol, using activated carbon in the recrystallization to remove color, to obtain the desired 2,6-dioxo-4-(benzothiol-2-ylmethyl)piperidine product as a solid melting at 176°–177° C.

EXAMPLE 2

2,6-dioxopiperidine-4-acetic acid (44 grams; 0.256 mole) and 25.4 grams (0.232 mole) of o-aminophenol are mixed together with 110 grams of syrupy polyphosphoric acid at room temperature and with stirring. The resulting mixture is heated for 1.25 hours at from 160°–170° C. while continuing the stirring. The warm mixture is then poured into cold water which initiates the precipitation of a solid and the stirring is continued until the resultant precipitate is crystalline, after which time the mixture is filtered. The solid obtained from the filtration is washed well with water and recrystallized from ethyl alcohol, stirring with decolorizing carbon, to obtain the desired 2,6-dioxo-4-(benzoxazol-2-ylmethyl)piperidine product as a crystalline solid melting at 196°–197° C.

EXAMPLE 3

36 grams (0.24 mole) of o-nitroaniline are dispersed in 150 milliliters of anhydrous piperidine. To the resultant solution are added 52 grams (0.27 mole) of 2,6-dioxopiperidine-4-acetyl chloride proportionwise at 30° C. over a ½ hour period. The mixture is heated for 2 hours at 55° C. with stirring and is thereafter poured into water which initiates precipitation. The resultant yellow precipitate is removed by filtration, giving the hydrated 2'-nitro-2,6-dioxopiperidine-4-acetanilide as a product.

42 grams (0.144 mole) of this product is dissolved in 480 milliliters of boiling 45 percent acetic acid. To the resultant solution are added, portionwise and with vigorous stirring, 40 grams (0.71 mole) of iron dust over a 50 minute period. Following this addition, stirring and refluxing is continued for 40 minutes more, after which time the mixture is filtered. The filtrate is concentrated in vacuum, diluted with water, and neutralized to a pH of 6 by the addition of ammonium hydroxide solution. The resulting precipitate upon such neutralization is recrystallized from 80 percent ethanol, activated carbon being used to remove color, to provide the desired 2,6-dioxo-4-(benzimidazol-2-ylmethyl)piperidine product as a solid melting at from 244° to 245° C.

EXAMPLE 4

Five grams (0.029 mole) of 2,6-dioxopiperidine-4-acetic acid are dispersed in 100 milliliters of toluene at room temperature with stirring. While the stirring is continued at room temperature, 5 grams of polyphosphoric acid are added followed, portionwise, by 5.24 grams (0.03 mole) of o-diaminobenzene. Following these additions, the resultant mixture is heated at 60° C. for 3 hours while the stirring is continued. Thereafter, the reaction mixture is poured into ice water, initiating precipitation. The precipitate is isolated by filtraton, washed with water, and recrystallized from ethanol to obtain the solid 2,6-dioxo-4-(benzimidazol-2-ylmethyl)piperidine product.

EXAMPLE 5

2,6 - dioxo - 4 - (benzothiazol-2-ylmethyl)piperidine (10 grams; 0.038 mole) is dispersed in a mixture of 100 milliliters of toluene and 60 milliliters of dimethylformamide. To this solution are gradually added 1.26 grams of a 50 percent sodium hydride oil dispersion (0.043 mole of sodium hydride). The mixture is warmed gradually to the boiling point and maintained under reflux conditions during which time 5.47 grams (0.045 mole) of dimethylamino-3-chloropropane dispersed in 25 milliliters of toluene are added over a 1.5 hour period. The refluxing is continued for an additional 9 hours. The reaction mixture is then cooled, filtered and concentrated in vacuum to a syrup. The syrup is crystallized from aqueous ethyl alcohol to obtain the desired 1-(dimethylaminopropyl)-2,6-dioxo-4-(benzothiazol - 2-ylmethyl)piperidine product is a solid melting at 93°–95° C.

EXAMPLE 6

To a solution of 6 grams (0.025 mole) of 2,6-dioxo-4-(benzoxazol-2-ylmethyl)piperidine in 50 milliliters of anhydrous toluene is added 1.26 grams of a 50 percent sodium hydride oil dispersion (0.026 mole of sodium hydride). The resultant mixture is warmed gradually to the boiling point and thereafter maintained at reflux temperatures. Over a 1.5 hour period, 3.32 grams (0.027 mole) of diethylamino-3-chloropropane in 25 milliliters of toluene are added with stirring. Refluxing is continued for an additional 5.5 hours. The reaction mixture is thereafter cooled, filtered and concentrated in vacuum to a syrup. A portion of this syrup is dissolved in ethanol and recrystallized to obtain the desired 1-dimethylaminopropyl-2,6 - dioxo-4-(benzoxazol - 2-ylmethyl)piperidine product. 1-dimethylaminopropyl-2,6-dioxo-4-(benzoxazol-2-ylmethyl)piperidine has a molecular weight of 330.4.

EXAMPLE 7

A portion of the syrup prepared as set forth in Example 6 is dissolved in anhydrous ether and to the resultant solution is added, with stirring, an ether solution saturated with hydrogen chloride. As stirring is continued for a few minutes, a solid precipitates. This solid is removed by filtration and is recrystallized from anhydrous ethyl alcohol to obtain the desired 1-(dimethylaminopropyl)-2,6-dioxo-4-(benzoxazol-2 - ylmethyl)piperidine hydrochloride product as a solid melting at 170°–171° C.

EXAMPLE 8

Ten grams (0.041 mole) of 2,6-dioxo-4-(benzimidazol-2-ylmethyl)piperidine are dispersed in 100 milliliters of acetone and to the resultant solution is added, portionwise, at room temperature, and with stirring, 7.5 grams (0.05 mole) of sodium iodide. The resultant mixture is heated to the boiling point and, while maintaining it under reflux conditions, 3.14 grams (0.04 mole) of isopropyl chloride are added over a 1 hour period. Refluxing is continued for an additional 3 hours and the reaction mixture is then cooled, filtered, and concentrated by evaporation. The concentrate is recrystallized from ethanol to obtain the 1-isopropyl-2,6-dioxo-4-(benzimidazol-2-ylmethyl)piperidine product having a molecular weight of 285.3.

EXAMPLE 9

Ten grams (0.041 mole) of 2,6-dioxo-4-(benzoxazol-2-ylmethyl)piperidine, 2.06 grams of sodium hydride in a 50 percent oil dispersion (0.045 mole sodium hydride), and 5.5 grams (0.045 mole) of allylbromide are reacted together by the procedure of Example 6 to obtain the 1-allyl-2,6-dioxo-4-(benzoxazol - 2 - ylmethyl)piperidine product as a solid melting at 82°–83° C.

In accordance with the method set forth herein, other compounds of the present invention are prepared as follows:

1-ethyl-2,6-dioxo-4-(benzimidazol-2 - ylmethyl)-piperidine which has a molecular weight of 271.3 by reacting together 2,6-dioxopiperidine-4-acetic acid and o-diaminobenzene and reacting the resulting 2,6-dioxo-4-(benzimidazol-2-ylmethyl)piperidine with bromoethane.

1-methyl-2,6-dioxo-4-(benzimidazol - 2 - ylmethyl)-piperidine which has a molecular weight of 257.3 by reacting together 2,6-dioxopiperidine-4-acetic acid and o-nitroaniline and reacting the resultant 2,6-dioxo-4-(benzimidazol-2-ylmethyl)piperidine with methyl bromide.

1-(methylaminoethyl)-2,6 - dioxo - 4-(benzimidazol-2-ylmethyl)piperidine which has a molecular weight of 300.4 by reacting together 2,6-dioxopiperidine-4-acetic acid and o-nitroaniline and reacting the resulting 2,6-dioxo - 4 - (benzimidazol - 2 - ylmethyl)piperidine with methylamino-2-chloroethane.

1-diethylaminoethyl-2,6-dioxo-4 - (2 - benzoxazol-2-ylmethyl)piperidine hydrobromide which has a molecular weight of 425.5 by reacting together 2,6-dioxopiperidine-4-acetic acid and o-aminophenol and reacting the resultant 2,6-dioxo-4-(benzoxazol - 2-ylmethyl)piperidine with diethylamino-2-chloroethane and reacting the resultant 1-(diethylaminoethyl)-2,6-dioxo-4-(benzoxazol-2-ylmethyl)piperidine with hydrogen bromide saturated ether solution.

1-(isopropylaminopropyl)-2,6-dioxo - 4-(benzoxazol-2-ylmethyl)piperidine which has a molecular weight of 343.5 by reacting together 2,6-dioxopiperidine-4-acetic acid and o-aminophenol and reacting the resultant 2,6-dioxo-4-(benzoxazol-2-ylmethyl)piperidine with isopropylamino-3-chloropropane.

The compounds of the present invention are useful as parasiticides for the control of a wide variety of household and agricultural pests such as arachnids, beetles, worms, ticks, aphids, flies, ascarids, trichostrongyloids, hookworms, pinworms, screwworms and cattle grubs. For such use, the unmodified compounds can be employed. Alternatively, the compounds can be dispersed in an edible solid to prepare animal feed compositions or on an inert finely divided solid to prepare dust compositions. The latter dust compositions can be dispersed in water with or without the aid of a wetting agent and the resultant aqueous dispersions employed as sprays. In other procedures, the compounds can be employed as a constituent in edible oils or in other oils or solvents or as a constituent in solvent-in-water or water-in-solvent emulsions or dispersions which can be employed as sprays, drenches or washes. Good results are obtained with methods employing and compositions containing parasiticidal amounts or concentrations of the novel compounds hereof. Preferred compositions contains from 50 to 10,000 parts per million of one or more of the compounds by weight.

In representative operations, 1-(dimethylaminopropyl)-2,6-dioxo-4-(benzoxazol-2-ylmethyl)piperidine hydrochloride and 1-allyl-2,6-dioxo-4-(benzothiazol-2-ylmethyl)piperidine each give 100 percent control and kill of mouse pinworms when each are separately incorporated as the sole parasiticide in the diet ration of mice infested with pinworms at a concentration of 0.06 percent by weight.

In further representative operations, 1-(dimethylaminopropyl)-2,6-dioxo-4-(benzoxazol-2-ylmethyl)-piperidine hydrochloride, 1-allyl-2,6-dioxo-4-(benzoxazol-2-yl-methyl)piperidine, and 2,6-dioxo-4-(benzimidazol-2-ylmethyl)piperidine each give 100 percent control and kill of mouse tapeworms when each are separately incorporated as the sole parasiticide in the diet ration of mice infested with tapeworms at a concentration of 0.06 percent by weight.

In still further operations, an aqueous composition containing 2000 parts per million of 1-dimethyl-aminopropyl-2,6-dioxo-4-(benzthiazol-2-ylmethyl)piperidine gives good control and kill of the Southern armyworm.

The starting compounds for the method of the present invention are known compounds. 2,6-dioxopiperidine-4-acetic acid (glutarimide-β-acetic acid), for example, can be prepared by a series of reactions involving first catalytically hydrogenating dimethylacetonedicarboxylate followed by dehydrogenation with phosphorus pentoxide of the resultant dimethyl β-hydroxy glutarate to provide the corresponding dimethyl glutaconate. This compound is then reacted with methyl cyanoacetate in the presence of sodium methoxide solution to provide the corresponding trimethyl α-cyanomethanetriacetate. This compound when treated with concentrated hydrochloric acid for 1 hour at room temperature provides 2,6-dioxopiperidine-4-acetic acid. The corresponding acetyl chloride thereof is prepared by treating the 2,6-dioxopiperidine-4-acetic acid with thionylchloride. These reactions are fully described, for example, by Phillips et al. Journal of the American Chemical Society, 79, 3517 (1957).

What is claimed is:

1. The compound selected from the group consisting of (a) the compound corresponding to the formula

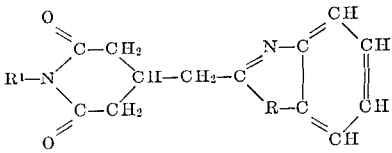

wherein R' represents hydrogen, (lower)alkyl, allyl, or (lower)alkylamino(lower)alkyl and R represents an oxygen atom, a sulfur atom or an imino group, and (b) the mineral acid salt of the compound of the above formula wherein R' is (lower)alkylamino(lower)alkyl.

2. The compound claimed in claim 1 wherein R' is hydrogen.

3. The compound claimed in claim 1 which is 2,6-dioxo-4-(benzoxazol-2-ylmethyl)piperidine.

4. The compound claimed in claim 1 which is 2,6-dioxo-4-(benzothiazol-2-ylmethyl)piperidine.

5. The compound claimed in claim 1 which is 2,6-dioxo-4-(benzimidazol-2-ylmethyl)piperidine.

6. The compound claimed in claim 1 which is 1-(dimethylaminopropyl)-2,6-dioxo-4-(benzoxazol-2-ylmethyl)piperidine hydrochloride.

7. The compound claimed in claim 1 which is 1-(dimethylaminopropyl)-2,6-dioxo-4-(benzothiazol-2-ylmethyl)piperidine.

References Cited
UNITED STATES PATENTS

| | | | |
|---|---|---|---|
| 3,314,960 | 4/1967 | Freed et al. | 260—281 |
| 3,314,969 | 4/1967 | Flay | 260—281X |
| 3,337,551 | 8/1967 | Faith | 260—281X |

DONALD G. DAUS, Primary Examiner

U.S. Cl. X.R.

260—304, 307, 309.2, 578; 424—267